(12) United States Patent
Kuwabara et al.

(10) Patent No.: US 10,286,769 B2
(45) Date of Patent: May 14, 2019

(54) WEATHER STRIP

(71) Applicant: NISHIKAWA RUBBER CO., LTD., Hiroshima-shi, Hiroshima (JP)

(72) Inventors: Hirokazu Kuwabara, Hiroshima (JP); Yoshitaka Nishimoto, Hiroshima (JP)

(73) Assignee: Nishikawa Rubber Co., Ltd., Hiroshima (JP)

( * ) Notice: Subject to any disclaimer, the term of this patent is extended or adjusted under 35 U.S.C. 154(b) by 193 days.

(21) Appl. No.: 15/634,138

(22) Filed: Jun. 27, 2017

(65) Prior Publication Data

US 2017/0368922 A1 Dec. 28, 2017

(30) Foreign Application Priority Data

Jun. 28, 2016 (JP) ................................ 2016-127973

(51) Int. Cl.
*B60J 10/77* (2016.01)
*B60J 10/25* (2016.01)
*B60J 10/84* (2016.01)

(52) U.S. Cl.
CPC ............... *B60J 10/77* (2016.02); *B60J 10/25* (2016.02); *B60J 10/84* (2016.02)

(58) Field of Classification Search
CPC ... B60J 10/77; B60J 10/25; B60J 10/84; B60J 10/79
See application file for complete search history.

(56) References Cited

U.S. PATENT DOCUMENTS

| | | | | |
|---|---|---|---|---|
| 4,047,751 A | * | 9/1977 | Koike | B60J 10/248 296/146.9 |
| 4,807,923 A | * | 2/1989 | Nakamura | B60J 10/248 296/146.2 |
| 4,919,471 A | * | 4/1990 | Seino | B60J 10/248 296/154 |
| 5,209,019 A | * | 5/1993 | Morita | B60J 10/248 49/475.1 |
| 5,311,702 A | * | 5/1994 | Moore | B60J 10/248 296/135 |
| 5,317,835 A | * | 6/1994 | Dupuy | B60J 10/235 49/377 |
| 5,346,273 A | * | 9/1994 | Takeuchi | B60J 10/24 296/146.9 |

(Continued)

FOREIGN PATENT DOCUMENTS

JP 07-037969 Y2 8/1995
JP 08-310242 A 11/1996
(Continued)

*Primary Examiner* — Justin B Rephann
(74) *Attorney, Agent, or Firm* — Mintz Levin Cohn Ferris Glovsky and Popeo, P.C.; David G. Conlin; Steven M. Jensen

(57) ABSTRACT

The present invention provides a weather strip which allows both (i) avoiding degradation in closing property of a door of a sashless door-type automobile and (ii) preventing intrusion of water into an inside of the automobile. A weather strip (1) includes a base (201), a sealing section (202), a seal lip section (203), and a stopper section (204). The stopper section (204) is provided with an open region (207) which, in a state where a door opening is closed, allows a first passage and a second passage, which are formed between the weather strip (1) and door glass (107), to communicate with each other on a side of a roof.

8 Claims, 4 Drawing Sheets

(56) References Cited

U.S. PATENT DOCUMENTS

| | | | | |
|---|---|---|---|---|
| 5,356,194 A * | 10/1994 | Takeuchi | ................ | B60R 13/04 |
| | | | | 296/146.9 |
| 7,172,239 B2 * | 2/2007 | Nozaki | .................... | B60J 10/79 |
| | | | | 296/146.9 |
| 7,487,615 B2 * | 2/2009 | Watanabe | ................ | B60J 10/74 |
| | | | | 49/428 |
| 8,176,681 B2 * | 5/2012 | Tamaoki | .................. | B60J 10/22 |
| | | | | 49/475.1 |
| 8,689,489 B2 * | 4/2014 | Mine | ........................ | B60J 10/76 |
| | | | | 49/441 |
| 8,869,456 B2 * | 10/2014 | Matsuura | .................. | E06B 7/22 |
| | | | | 49/489.1 |
| 8,869,457 B2 * | 10/2014 | Masumoto | ............... | B60J 10/24 |
| | | | | 49/495.1 |
| 2007/0251152 A1 * | 11/2007 | Takase | .................... | B60J 10/74 |
| | | | | 49/441 |
| 2012/0159858 A1 * | 6/2012 | Mori | ........................ | B60J 10/24 |
| | | | | 49/476.1 |
| 2012/0159860 A1 * | 6/2012 | Matsuwaki | .............. | B60J 10/77 |
| | | | | 49/490.1 |
| 2012/0159861 A1 * | 6/2012 | Mori | ...................... | B60J 10/248 |
| | | | | 49/495.1 |
| 2013/0160375 A1 * | 6/2013 | Kuwabara | ............. | E06B 7/2303 |
| | | | | 49/490.1 |
| 2017/0267088 A1 * | 9/2017 | Shinohara | ................ | B60J 10/21 |
| 2017/0368923 A1 * | 12/2017 | Kuwabara | ............... | B60J 10/84 |

FOREIGN PATENT DOCUMENTS

| | | |
|---|---|---|
| JP | 09-295514 A | 11/1997 |
| JP | 2602512 Y2 | 1/2000 |

* cited by examiner

WEATHER STRIP

This Nonprovisional application claims priority under 35 U.S.C. § 119 on Patent Application No. 2016-127973 filed in Japan on Jun. 28, 2016, the entire contents of which are hereby incorporated by reference.

TECHNICAL FIELD

The present invention relates to a weather strip which is attached to a peripheral section of a door opening of a sashless door-type automobile.

BACKGROUND ART

Conventionally, for sashless door-type automobiles such as a hard top, research and development of weather strips with various structures has been conducted in order to improve sealing properties, sound insulating properties, and the like at a peripheral section of an opening in a body of such an automobile.

Figure 4:
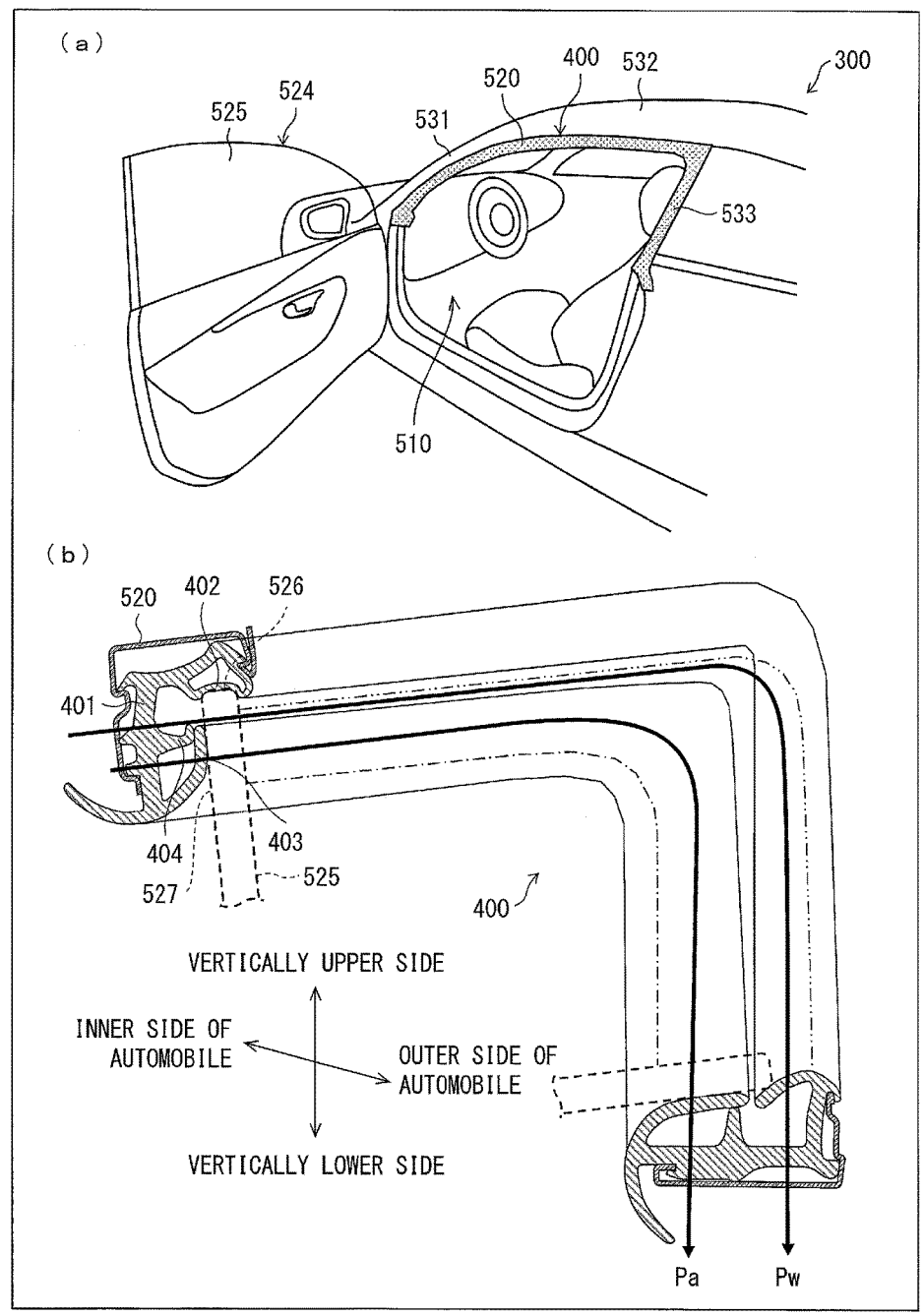

With reference to FIG. 4, the following description will discuss a reference example of the structure of a weather strip. (a) of FIG. 4 is a perspective view schematically illustrating an arrangement in the vicinity of a door opening in a sashless door-type automobile to which a weather strip in accordance with the reference example is attached. (b) of FIG. 4 is a schematic view illustrating a positional relationship between the weather strip illustrated in (a) of FIG. 4 and door glass at a time when a door is closed.

As illustrated in (a) of FIG. 4, a weather strip 400 is attached to a region of an automobile 300 which region extends, on a side of a body of the automobile, from a lower end of a front pillar 531 through a roof 532 to a lower end of a center pillar 533. The weather strip 400 seals between a peripheral section 520 of a door opening 510 and door glass 525 of a sashless door 524.

Next, with reference to (b) of FIG. 4, the following description will further detail the structure of the weather strip 400 described above.

As illustrated in (b) of FIG. 4, the weather strip 400 includes (i) a base 401 secured along the peripheral section 520, (ii) a sealing section 402 which erects from one end of the base 401 and, when the sashless door 524 is closed, seals a peripheral section of the door glass 525, (iii) a seal lip section 403 which erects from the other end of the base 401, and (iv) a stopper section 404 which erects from the base 401 between the sealing section 402 and the seal lip 403. The seal lip section 403 is in a shape of a gutter which is open on a side of the sealing section 402, and receives rain, washing water, or the like which flows down from the roof 532 of the automobile 300.

When the sashless door 524 is closed, a tip surface 526 of the door glass 525 comes in elastic contact with the sealing section 402, and a side surface 527 of the door glass 525 on an inner side of the automobile comes in elastic contact with the seal lip section 403. In a state where the sashless door 524 is closed, the stopper section 404 restricts the seal lip section 403, which is in elastic contact with the door glass 525, from moving toward the inner side of the automobile.

Note here that, in the case of the weather strip 400 having the structure described above, closing the sashless door 524 causes air to enter a first space surrounded by the base 401, the seal lip section 403, the stopper section 404, and the door glass 525. Force to close the sashless door 524 urges the air to flow in a direction indicated by an arrow Pa in (b) of FIG. 4.

However, in the destination of the direction indicated by the arrow Pa, a panel section (not shown) of the sashless door 524 is provided. This prevents the air which has entered the first space from being discharged outside. This may invite sudden generation of reactive force in the vicinity of an area extending from a belt line BL to a lock section of the automobile 300, and consequently cause degradation in closing property of the sashless door 524.

Furthermore, in the case of the structure as described above of the weather strip 400, rain or the like received by the seal lip section 403 may leak through a tip of the seal lip 403 on the sealing section 402 side into a second space surrounded by the base 401, the sealing section 402, the stopper section 404, and the door glass 525. Note here that the second space is located in the vicinity of the tip of the door glass 525 in a state where the sashless door 524 is closed. As such, for example, in a case where some kind of load is applied to the door glass 525, water that has leaked into the second space on a side of the center pillar 533 may further seep out onto a sealing surface (not shown) for attachment of the weather strip 400. In a worst case, the water may intrude into an inside of the automobile 300.

Patent Literatures 1 and 2 disclose weather strips which are different from the weather strip illustrated in (b) of FIG. 4. The weather strip of Patent Literature 1 is intended for simplifying the structure of the weather strip, and the weather strip of Patent Literature 2 is intended for designing the structure of sealing between a door and a door opening provided in a body of a sashless door-type automobile to be one which (i) allows door glass to be moved up and down linearly along a vertical direction and (ii) is simple. The weather strips disclosed in Patent Literatures 1 and 2 are thus different in structure from the weather strip 400 illustrated in (b) of FIG. 4, and Patent Literatures 1 and 2 neither disclose nor suggest any means for solving the problems described above of the weather strip illustrated in (b) of FIG. 4.

CITATION LIST

Patent Literature

[Patent Literature 1]
Japanese Examined Utility Model Application Publication, Jitsukohei, No. 7-37969 (Publication date: Oct. 11, 1990)
[Patent Literature 2]
Japanese Patent Application Publication Tokukaihei No. 9-295514 (Publication date: Nov. 18, 1997)

SUMMARY OF INVENTION

Technical Problem

The present invention is accomplished in view of the problems described above. An object of the present invention is to provide a weather strip which allows both (i) avoiding degradation in closing property of a door of a sashless door-type automobile and (ii) preventing intrusion of water into an inside of the automobile.

Solution to Problem

In order to attain the object, a weather strip in accordance with an aspect of the present invention is a weather strip which is attached to a peripheral section of a sashless door opening of an automobile, the peripheral section at least extending from a roof side to a pillar, including: a base secured along the peripheral section; a sealing section erecting from one end of the base and, in a door opening-closed state in which the sashless door opening has been closed by a sashless door, coming into elastic contact with a peripheral end surface of door glass; a seal lip section erecting from the other end of the base and, in the door opening-closed state, coming into elastic contact with a side surface of the door glass; and a stopper section erecting from the base between the sealing section and the seal lip section and, in the door opening-closed state, restricting movement of the door glass, which is in elastic contact with the seal lip section, toward an inner side of the automobile, the stopper section being provided with an open region which, in the door opening-closed state, allows a first passage, which is formed by being surrounded by the base, the seal lip section, the stopper section, and the door glass, and a second passage, which is formed by being surrounded by the base, the sealing section, the stopper section, and the door glass, to communicate with each other on a side of the roof side.

Advantageous Effects of Invention

A weather strip in accordance with an aspect of the present invention allows both (i) avoiding degradation in closing property of a door of a sashless door-type automobile and (ii) preventing intrusion of water into an inside of the automobile.

Figure 1:
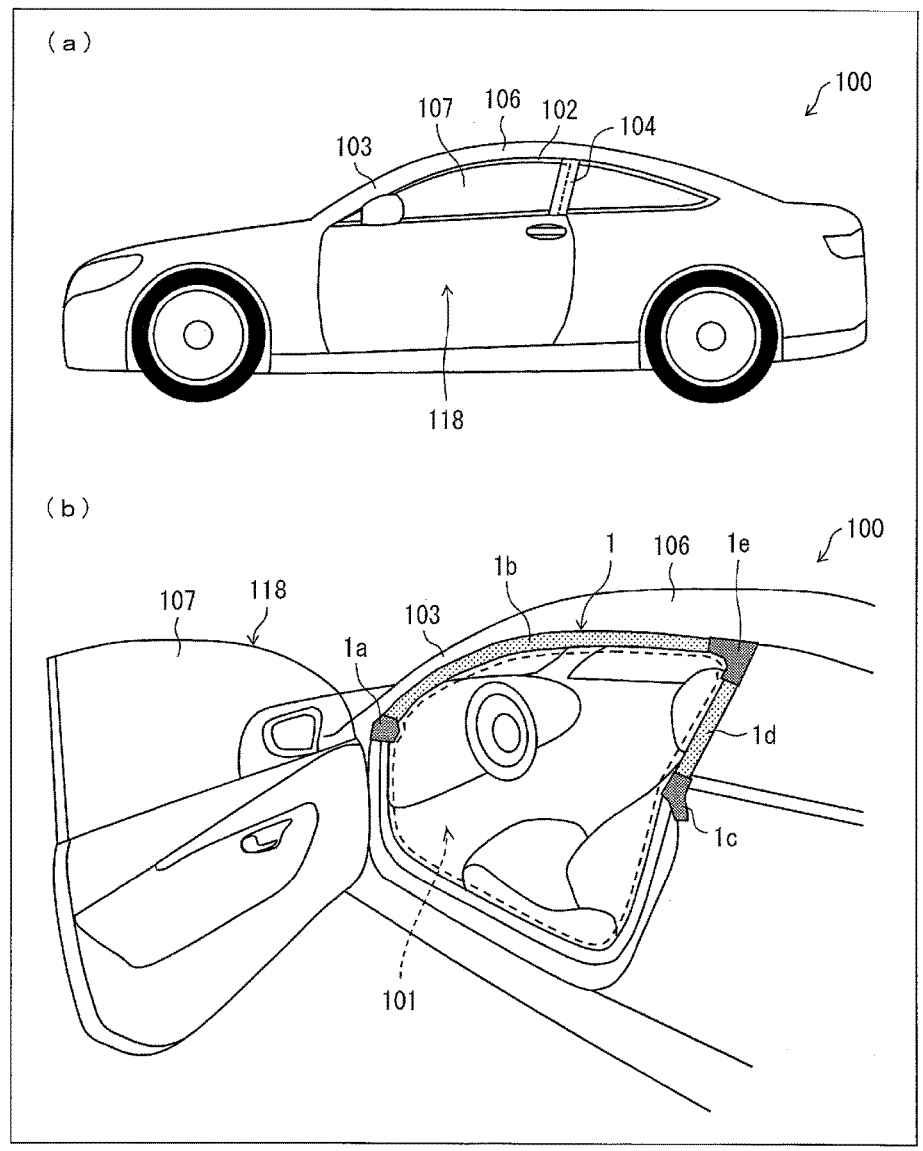

BRIEF DESCRIPTION OF DRAWINGS (a) of FIG. 1 is a side view of a sashless door-type automobile to which a weather strip in accordance with an embodiment of the present invention is attached. (b) of FIG. 1 is a perspective view schematically illustrating an arrangement around a door opening on a front side of the automobile illustrated in (a) of FIG. 1.

Figure 2:
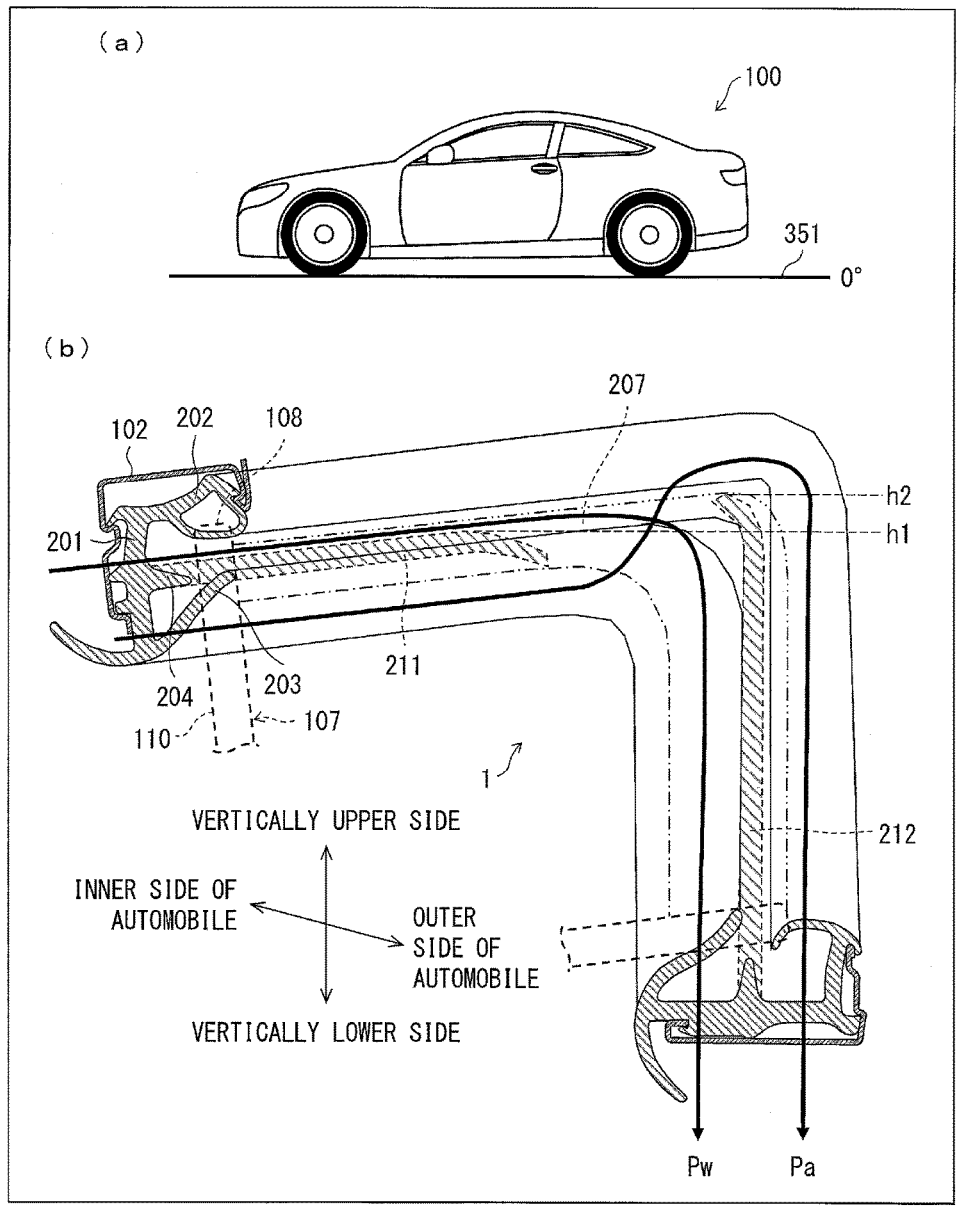

(a) of FIG. 2 is a side view of the automobile, illustrated in FIG. 1, in a case where a body of the automobile is in a horizontal state. (b) of FIG. 2 is a schematic view illustrating a positional relationship, at a time when a door is closed, between the weather strip and door glass of the automobile in the state shown in (a) of FIG. 2.

Figure 3:
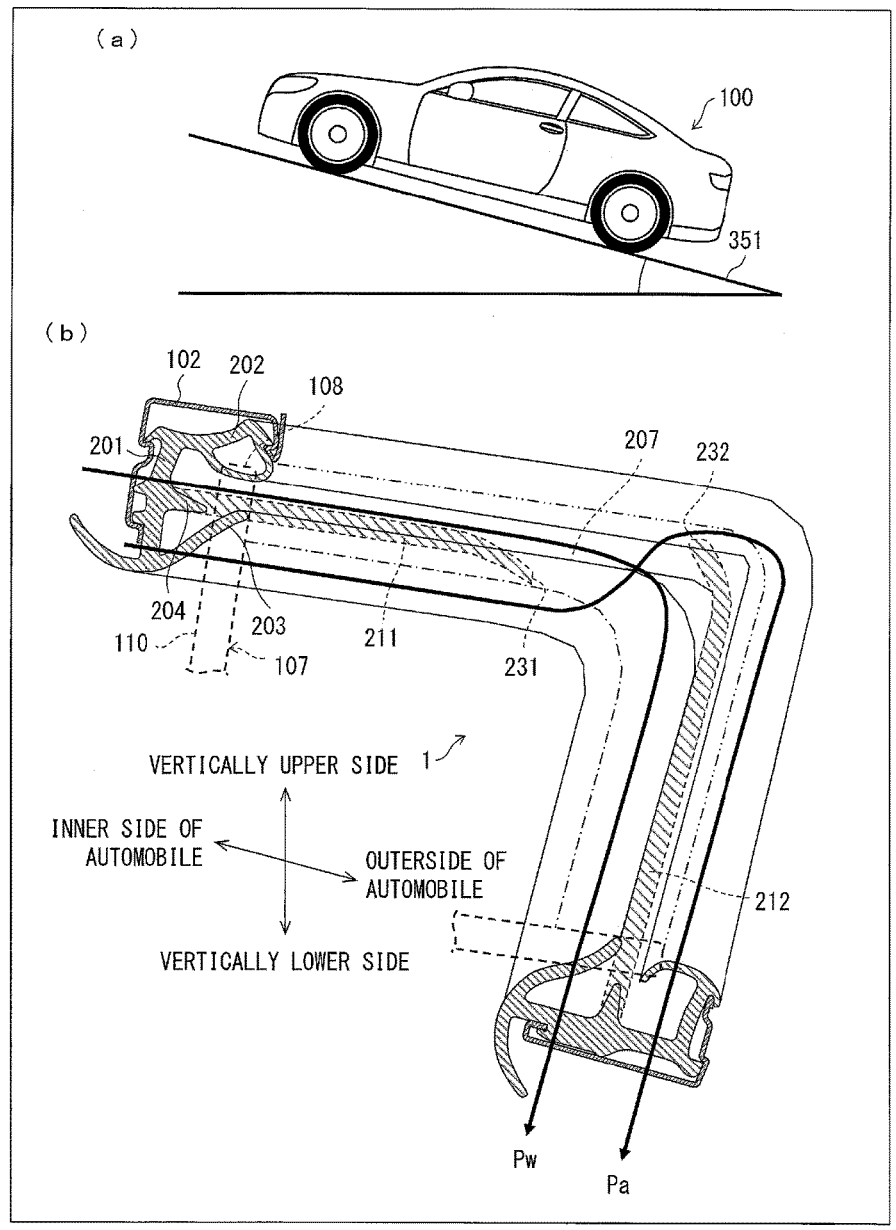

(a) of FIG. 3 is a side view of the automobile, illustrated in FIG. 1, in a state where a front of the body of the automobile is tilted upward. (b) of FIG. 3 is a schematic view illustrating a positional relationship, at a time when the door is closed, between the weather strip and the door glass of the automobile in the state shown in (a) of FIG. 3.

(a) of FIG. 4 is a perspective view schematically illustrating an arrangement in the vicinity of a door opening in a sashless door-type automobile to which a weather strip in accordance with a reference example is attached. (b) of FIG. 4 is a schematic view illustrating a positional relationship between the weather strip illustrated in (a) of FIG. 4 and door glass at a time when a door is closed.

DESCRIPTION OF EMBODIMENTS

<Example of Attachment of Weather Strip>

The following description will first discuss, with reference to FIG. 1, a structure around a door opening of an automobile to which a weather strip in accordance with the present invention is attached. (a) of FIG. 1 is a side view of a sashless door-type automobile to which a weather strip in accordance with an embodiment of the present invention is attached. (b) of FIG. 1 is a perspective view schematically illustrating an arrangement around a door opening on a front side of the automobile illustrated in (a) of FIG. 1.

As illustrated in (a) and (b) of FIG. 1, a weather strip 1 is attached to a peripheral section 102 of a door opening (sashless door opening) 101 on a front side of a hardtop (automobile) 100. The weather strip 1 is made of an elastic member and seals between the peripheral section 102 and front door glass (door glass) 107. Specifically, the weather strip 1 is attached to a region which extends, on a side of a body of the automobile, from a lower end of a front pillar (pillar) 103 through a roof side 106 to a lower end of a center pillar (pillar) 104.

More specifically, the peripheral section 102 refers to a peripheral section 102 of the door opening 101 on the front side, against which peripheral section 102 an outer peripheral edge of the door glass 107 directly abuts above a belt line BL (a portion in the vicinity of a boundary between a door panel and the door glass of the sashless door) when the door is closed.

Note that the term "when the door is closed" herein refers to a closed state of the door opening 101, in which state the door opening 101 has been closed by a door (sashless door) 118 on the front side. Hereinafter, the closed state of the door opening 101 may be referred to as "when the door is closed." Details of the elastic member which constitutes the weather strip 1 will be described later.

As illustrated in (b) of FIG. 1, a first mold-molded section 1a and a first extrusion molded section 1b of the weather strip 1 integrally constitute a portion where the front pillar 103 and the roof side 106 are sealed. A second mold-molded section 1c and a second extrusion molded section 1d of the weather strip 1 integrally constitute a portion where the center pillar 104 is sealed. Further, the first extrusion molded section 1b and the second extrusion molded section 1d are connected to each other by being integral with a third mold-molded section 1e which is substantially L shaped and provided in a region in the vicinity of a portion of the peripheral section 102 in which portion the center pillar 104 and the roof side 106 are connected to each other.

The portion of the weather strip 1 in which portion the front pillar 103 and the roof side 106 are sealed is formed in the following manner. First, the first extrusion molded section 1b is molded by extrusion molding with use of a general extruder or the like. Next, an end of the first extrusion molded section 1b is set in a metallic mold, and the first mold-molded section 1a is molded by metallic molding with use of an injection molder or a transfer molder. Thus, the first mold-molded section 1a and the first extrusion molded section 1b of the weather strip 1 are integrally molded. Also in the portion of the weather strip 1 in which portion the center pillar 104 is sealed, the second mold-molded section 1c and the second extrusion molded section 1d of the weather strip 1 are integrally molded by a similar method to the above-described method.

Lastly, an end of the first extrusion molded section 1b at which end the first mold-molded section 1a is not provided and an end of the second extrusion molded section 1d at which end the second mold-molded section 1c is not provided are set in a metallic mold, and the third mold-molded section 1e is molded by metallic molding with use of an injection molder or the like. Thus, the first extrusion molded section 1b and the second extrusion molded section 1d are integrated with the third mold-molded section 1e, so that the weather strip 1 is provided.

<Structure of Weather Strip>

Next, with reference to FIG. 2, the following description will discuss a structure of the weather strip 1 which has been described with reference to FIG. 1. (a) of FIG. 2 is a side view of the automobile, illustrated in FIG. 1, in a case where the body of the automobile is in a horizontal state. (b) of FIG. 2 is a schematic view illustrating a positional relationship, at a time when the door is closed, between the weather strip and the door glass of the automobile in the state shown in (a) of FIG. 2. As used herein, "horizontal state" refers to a state in which, as shown in (a) of FIG. 2, an angle between a direction perpendicular to a vertical direction and a surface 351 on which the body of the automobile 100 is laid is 0°.

As illustrated in (b) of FIG. 2, the weather strip 1 includes (i) a base 201 secured along the peripheral section 102, (ii) a sealing section 202 which erects from one end of the base 201, (iii) a seal lip section 203 which erects from the other end of the base 201 and is in a shape of a gutter which is open on a sealing section 202 side, and (iv) a stopper section 204 which erects from the base 201 between the sealing section 202 and the seal lip 203.

The sealing section 202 is hollow shaped on a roof side 106 (see (b) of FIG. 1) side and, when the door is closed, comes in elastic contact with a peripheral end surface 108 of the door glass 107. The seal lip section 203 has a tongue extending toward the sealing section 202, and thus has a shape of a gutter which is open on a sealing section 202 side. When the door is closed, the seal lip section 203 comes in elastic contact with a side surface 110 of the door glass 107 on an inner side of the automobile. When the door is closed, the stopper section 204 restricts the seal lip section 203, which is in elastic contact with the side surface 110 of the door glass 107, from moving toward the inner side of the automobile.

The stopper section 204 is provided with an open region 207 by having a part of the stopper section 204 detached on the roof side 106 (FIG. 1) side. The stopper section 204 is divided into a first stopper section 211 and a second stopper section 212 via the open region 207.

The stopper section 204 is arranged so that, in a case where the body of the automobile 100 is in the horizontal state as illustrated in (a) of FIG. 2, a position of a vertically highest portion of the first stopper section 211 (indicated as "h1" in FIG. 2) is vertically lower than that of a vertically highest portion of the second stopper section 212 (indicated as "h2" in FIG. 2).

According to the arrangement above, when the door is closed, there is formed a space surrounded by the weather strip 1 and the door glass 107, as illustrated in (b) of FIG. 2. Hereinafter, a space formed by being surrounded by the base 201, the seal lip section 203, the stopper section 204, and the door glass 107 will be referred to as a first passage (indicated as a dash-dot line in (b) of FIG. 2), and a space formed by being surrounded by the base 201, the sealing section 202, the stopper section 204, and the door glass 107 will be referred to as a second passage (indicated as a dash-dot-dot line in (b) of FIG. 2). In the present embodiment, the first passage communicates with the second passage through the open region 207 on the roof side 106 (see (a) of FIG. 1) side of the automobile 100.

As such, according to the weather strip 1, part of air flowing through the first passage when the door is closed flows into the second passage through the open region 207 on the roof side 106 (see (a) of FIG. 1) side. That is, at this time, the air flows in a direction indicated by an arrow Pa in (b) of FIG. 2. Thus, according to the weather strip 1, an amount of air flowing through the first passage decreases on a center pillar 104 (see (a) of FIG. 1) side. This eliminates the risk of sudden generation of reactive force in the vicinity of an area extending from the belt line (not shown) to the lock section (not shown) of the automobile 100. The weather strip 1 thus allows preventing a closing property of the door 118 from being degraded by sudden generation of reactive force.

Further, according to the weather strip 1, even in a case where rain or the like leaks into the second passage through a tip of the seal lip section 203 on the sealing section 202 side, the water flowing through the second passage flows into the first passage through the open region 207 on the roof side 106 (see (a) of FIG. 1) side. That is, at this time, the water flows in a direction indicated by an arrow Pw in (b) of FIG. 2. As such, on the center pillar 104 (see (b) of FIG. 1) side, water flows through the first passage which is located away from the center pillar 104. Accordingly, even in a case where some kind of load is applied to the door glass 107, the water is not likely to seep out onto a sealing surface (not shown) of the weather strip 1 on the center pillar 104 side. The weather strip 1 thus allows preventing intrusion of water into an inside of the automobile 100.

Note that although the present embodiment has described an example in which the weather strip is attached to a particular portion of the peripheral section, a portion to which the weather strip of the present invention is attached is not limited to this, provided that the weather strip is attached to a portion of a peripheral section which portion at least extends from a roof to a pillar of a door opening of an automobile.

Further, according to the present embodiment, the sealing section and the seal lip section have respective particular shapes as illustrated in (b) of FIG. 2. However, the sealing section and the seal lip section are not limited to the shapes illustrated in the present embodiment, and can have other shapes provided that at least each of the sealing section and the seal lip section comes into elastic contact with door glass when the door is closed.

Furthermore, although the number of open regions provided to the stopper section is one (1) in the present embodiment, the number is not limited to this and can be two or more.

Further, according to the present embodiment, the stopper section has a particular shape and vertically highest portions of the respective first and second stopper sections are located at respective particular positions. Note, however, that the shapes and positions of the first and second stopper sections in accordance with the present invention are not limited to these, provided that, at least on a side of the roof of the automobile, an open region which allows the first passage and the second passage to communicate with each other is provided between the first stopper section and the second stopper section.

Furthermore, although the present embodiment has discussed an example in which the weather strip is attached to a particular automobile, but an automobile to which the weather strip in accordance with the present invention is to be attached may be any type of automobile, provided that it is a sashless door-type automobile. Accordingly, the weather strip in accordance with the present invention is applicable, for example, to a convertible whose roof can be open, instead of the hardtop described above.

Next, with reference to FIG. 3, the following description will discuss a preferable embodiment of the weather strip in accordance with the present embodiment. Note that the same reference signs will be given to members which have been described above, and descriptions on such a member will be omitted.

(a) of FIG. 3 is a side view of the automobile, illustrated in FIG. 1, in a state where a front of the body of the automobile is tilted upward. (b) of FIG. 3 is a schematic view illustrating a positional relationship, at a time when the door is closed, between the weather strip and the door glass of the automobile in the state shown in (a) of FIG. 3. As used herein, "a state where a front of the body of the automobile is tilted upward" refers to a state in which the front of the body of the automobile 100, that is, a side of the automobile 100 which side includes a handle (not shown), is tilted upward from to the horizontal state illustrated in (a) of FIG. 2. In other words, "a state where a front of the body of the automobile is tilted upward" refers to a state in which a surface 351 on which the automobile 100 is laid is tilted from the state illustrated in (a) of FIG. 2.

In the preferable embodiment in accordance with the present invention, the weather strip 1 is in such an arrangement that, as illustrated in (b) of FIG. 3, an end 232 of the second stopper section 212 extends vertically upward on an open region 207 side so as to be away from an end 231 of the first stopper section 211.

According to the arrangement, even in a state where the front of the body of the automobile 100 is tilted as illustrated in (a) of FIG. 3, water flowing through the second passage efficiently flows into the first passage through the open region 207 on the roof side 106 (see (a) of FIG. 1) side of the automobile 100. As such, even in a case where, for example, the automobile 100 is driving up a hill, it is possible to achieve an effect of preventing intrusion of water into the inside of the automobile.

Note that, as described above, the weather strip 1 is made of an elastic member such as a rubber material in the present embodiment. Examples of an elastic material constituting the elastic member encompass EPDM (ethylene-propylene-diene rubber), IR (isoprene rubber), CR (chloroprene rubber), a thermoplastic elastomer (olefin or styrene thermoplastic elastomer), soft polyvinyl chloride, and the like. These elastic materials may be sponge-like or solid. The weather strip in accordance with the present embodiment may be made of a single type of elastic material or made of two or more types of elastic materials which are different from each other. A part or whole of the weather strip 1 may be sponge-like or solid.

In a case where, for example, the stopper section described above is made of an elastic member which is more solid than portions other than the stopper section, the weather strip can be prevented from being deteriorated with age. In this case, the weather strip may be arranged such that the sealing section and the seal lip section are each made of a sponge-like EPDM having a specific gravity equivalent to 0.5 to 0.65. Further, for example, the stopper section 204 may be made of a solid EPDM having a hardness equivalent to 50 to 70.

Note that a method for manufacturing the weather strip in accordance with the present embodiment is not particularly limited, provided that the weather strip obtained by the method has the arrangements described above. It is therefore possible to manufacture the weather strip in accordance with the present embodiment with use of a general extruder or the like.

<Conclusion>

In order to attain the object, a weather strip in accordance with an aspect of the present invention is a weather strip which is attached to a peripheral section of a sashless door opening of an automobile, the peripheral section at least extending from a roof side to a pillar, including: a base secured along the peripheral section; a sealing section erecting from one end of the base and, in a door opening-closed state in which the sashless door opening has been closed by a sashless door, coming into elastic contact with a peripheral end surface of door glass; a seal lip section erecting from the other end of the base and, in the door opening-closed state, coming into elastic contact with a side surface of the door glass; and a stopper section erecting from the base between the sealing section and the seal lip section and, in the door opening-closed state, restricting movement of the door glass, which is in elastic contact with the seal lip section, toward an inner side of the automobile, the stopper section being provided with an open region which, in the door opening-closed state, allows a first passage, which is formed by being surrounded by the base, the seal lip section, the stopper section, and the door glass, and a second passage, which is formed by being surrounded by the base, the sealing section, the stopper section, and the door glass, to communicate with each other on a side of the roof side.

The arrangement above realizes a structure in which part of air flowing through the first passage on the roof-side side of the automobile in the door opening-closed state can flow into the second passage through the open region. This decreases an amount of air flowing through the first passage on a pillar side of the automobile, and accordingly allows avoiding, at the time of closing the door, sudden generation of reactive force in the vicinity of an area extending from a belt line to a lock section of the automobile. This allows preventing a closing property of the door from being degraded by sudden generation of reactive force.

Further, according to the arrangement above, water flowing through the second passage on the roof-side side of the automobile in the door opening-closed state flows into the first passage through the open region. As such, on the pillar side of the automobile, water flows through the first passage which is located away from the pillar side. Accordingly, even in a case where some kind of load is applied to the door glass, the water is not likely to seep to the pillar side. The arrangement above thus allows preventing intrusion of water into an inside of the automobile.

Further, in order to attain the object, a weather strip in accordance with an aspect of the present invention is preferably arranged such that the stopper section is divided into a first stopper section and a second stopper section via the open region, and in a case where a body of the automobile is in a horizontal state, a vertically highest portion of the first stopper section is located vertically lower than a vertically highest portion of the second stopper section.

According to the arrangement above, water flowing through the second passage efficiently flows into the first passage through the open region on the roof-side side of the automobile. This improves an effect of preventing intrusion of water into the inside of the automobile.

Further, in order to attain the object, a weather strip in accordance with an aspect of the present invention is preferably arranged such that on the side of the open region, an end of the second stopper section extends vertically upward so as to be away from an end of the first stopper section.

According to the arrangement above, even in a state where a front of the body of the automobile is tilted, water flowing through the second passage efficiently flows into the first passage through the open region on the roof-side side of the automobile. As such, even in a case where, for example, the automobile is driving up a hill, it is possible to achieve an effect of preventing intrusion of water into the inside of the automobile.

Further, in order to attain the object, a weather strip in accordance with an aspect of the present invention is preferably arranged such that the stopper section is made of an elastic member which is more solid than other portions of the weather strip.

The arrangement above enables prevention of deterioration of the weather strip with age.

<Supplementary Note>

The present invention is not limited to the embodiments, but can be altered by a skilled person in the art within the scope of the claims. An embodiment derived from a proper combination of technical means each disclosed in a different embodiment is also encompassed in the technical scope of the present invention.

REFERENCE SIGNS LIST

1: weather strip
101: door opening
100: automobile
102: peripheral section
104: center pillar (pillar)
106: roof side
107: door glass
108: peripheral end surface
201: base
202: sealing section
203: seal lip section
204: stopper section
207: open region
351: surface on which automobile is laid

The invention claimed is:

1. A weather strip which is attached to a peripheral section of a sashless door opening of an automobile, the peripheral section at least extending from a roof side to a pillar, comprising:
   a base secured along the peripheral section;
   a sealing section erecting from one end of the base and, in a door opening-closed state in which the sashless door opening has been closed by a sashless door, coming into elastic contact with a peripheral end surface of a door glass;
   a seal lip section erecting from an other end of the base and, in the door opening-closed state, coming into elastic contact with a side surface of the door glass; and
   a stopper section erecting from the base between the sealing section and the seal lip section and, in the door opening-closed state, restricting movement of the door glass, which is in elastic contact with the seal lip section, toward an inner side of the automobile,
   the stopper section being provided with an open region which, in the door opening-closed state, allows a first passage, which is formed by being surrounded by the base, the seal lip section, the stopper section, and the door glass, and a second passage, which is formed by being surrounded by the base, the sealing section, the stopper section, and the door glass, to communicate with each other on a side of the roof side.

2. The weather strip as set forth in claim 1, wherein:
   the stopper section is divided into a first stopper section and a second stopper section via the open region; and
   in a case where a body of the automobile is in a horizontal state, a vertically highest portion of the first stopper section is located vertically lower than a vertically highest portion of the second stopper section.

3. The weather strip as set forth in claim 2, wherein on a side of the open region, an end of the second stopper section extends vertically upward so as to be away from an end of the first stopper section.

4. The weather strip as set forth in claim 3, wherein the stopper section is made of an elastic member which is more solid than other portions of the weather strip.

5. The weather strip as set forth in claim 2, wherein the stopper section is made of an elastic member which is more solid than other portions of the weather strip.

6. The weather strip as set forth in claim 1, wherein on a side of the open region, an end of a second stopper section extends vertically upward so as to be away from an end of a first stopper section.

7. The weather strip as set forth in claim 6, wherein the stopper section is made of an elastic member which is more solid than other portions of the weather strip.

8. The weather strip as set forth in claim 1, wherein the stopper section is made of an elastic member which is more solid than other portions of the weather strip.

* * * * *